(12) United States Patent
Yamamoto et al.

(10) Patent No.: US 7,519,350 B2
(45) Date of Patent: Apr. 14, 2009

(54) DUSTPROOF STRUCTURE AND DUST ENTRY PREVENTING METHOD AND ELECTRONIC DEVICE HAVING SAME DUSTPROOF STRUCTURE

(75) Inventors: Atsushi Yamamoto, Saitama (JP); Shigehiro Terada, Saitama (JP)

(73) Assignee: NEC Corporation, Tokyo (JP)

( * ) Notice: Subject to any disclaimer, the term of this patent is extended or adjusted under 35 U.S.C. 154(b) by 511 days.

(21) Appl. No.: 11/315,321

(22) Filed: Dec. 23, 2005

(65) Prior Publication Data
US 2006/0171107 A1    Aug. 3, 2006

(30) Foreign Application Priority Data
Dec. 27, 2004    (JP) .............................. 2004-378312

(51) Int. Cl.
*H04B 1/38* (2006.01)
(52) U.S. Cl. .................... 455/347; 455/575.1; 455/90.3; 455/128; 361/518; 379/428.01; 379/428.02
(58) Field of Classification Search ............. 455/575.1, 455/90.3, 128, 347; 379/330, 428.01, 428.02; 361/517, 518, 519
See application file for complete search history.

(56) References Cited

U.S. PATENT DOCUMENTS

| | | | |
|---|---|---|---|
| 6,897,852 B2 * | 5/2005 | Grosfeld et al. ............. 345/173 |
| 7,333,777 B2 * | 2/2008 | Qin et al. .................... 455/90.3 |
| 2005/0053779 A1 * | 3/2005 | Saitou et al. ............. 428/304.4 |
| 2006/0140438 A1 * | 6/2006 | Kimura et al. .............. 381/431 |
| 2006/0146486 A1 * | 7/2006 | Wikstrom et al. ........... 361/681 |
| 2006/0155074 A1 * | 7/2006 | Kudo et al. .............. 525/329.7 |

FOREIGN PATENT DOCUMENTS

| | | |
|---|---|---|
| CN | 1132464 A | 10/1996 |
| CN | 1277529 A | 12/2000 |
| CN | 1284256 A | 2/2001 |

OTHER PUBLICATIONS

"Nikkei Business", Nikei Business Publication, Inc., Nov. 1, 2004, p. 90.
First Office Action issued by the Chinese Patent Office on Jan. 25, 2008, in relation to the corresponsing Chinese application with Japanese and English language translations, pp. 1 to 20.

* cited by examiner

*Primary Examiner*—CongVan Tran
(74) *Attorney, Agent, or Firm*—Whitham, Curtis, Christofferson & Cook, PC

(57) ABSTRACT

A structure is provided which is capable of reliably suppressing deformation caused by deterioration of a gasket member to maintain a dustproof function and of avoiding interference with other components mounted within electronic devices including a liquid crystal display panel. When the gasket member is made flat due to its secular changes (in geometry) and is made to extend in its width direction and, as a result, its inner wall face is deformed toward a central portion of an aperture attributed to an increase in the width of the gasket member, the deformation is suppressed by making an outer wall face of a stopping rib press the inner wall face of the gasket member.

13 Claims, 19 Drawing Sheets

DUSTPROOF STRUCTURE AND DUST ENTRY PREVENTING METHOD AND ELECTRONIC DEVICE HAVING SAME DUSTPROOF STRUCTURE

BACKGROUND OF THE INVENTION

1. Field of the Invention

The present invention relates to a dustproof structure and a dust entry preventing method in an electronic device and the electronic device employing the structure and method and more particularly to the dustproof structure and the dust entry preventing method employed in, for example, a portable-type electronic device such as a foldable portable cellular phone using a screen component to protect a display panel as a diaphragm which is attached to a cabinet with a gasket member interposed between the diaphragm and the cabinet, and to the electronic device having the structure and using the dust entry preventing method.

The present application claims priority of Japanese Patent Application No. 2004-378312 filed on Dec. 27, 2004, which is hereby incorporated by reference.

2. Description of the Related Art

In recent years, due to high versatility of being usable even during movement of a user or while on a road, a portable electronic device such as a portable cellular phone is now in widespread use. Popularity has been gained by many users to a foldable and freely opened-closed type portable cellular phone, in particular, since the portable cellular phone can be housed in a compact state. The foldable portable cellular phone has become commercially practical which is so configured that, by using a two-shaft hinge, one cabinet is allowed to freely rotate relative to another cabinet in a portion surrounding one rotational shaft mounted in a direction perpendicular to another rotational shaft used to open or close the cabinet.

In a portable cellular phone 101, as shown in FIGS. 15 and 16, an upper unit 102 and a lower unit 103 are connected to each other by a two-shaft hinge 104 and, on an upper cabinet 105 of the upper unit 102 are mounted a speaker section 106 to output a received voice and a display section 107 made up of a liquid crystal display device and, on a lower cabinet 108 of the lower unit 103 are mounted an operating section 109 made up of various operational keys, a microphone section 110 to receive a transmitting voice, and a voice outputting section 111 having a speaker.

Moreover, the display section 107, as shown in FIG. 17, has a liquid crystal display panel 112 and a backlight to supply illuminating light to the liquid crystal display panel 112, all of which are held by a holding frame 113 and are mounted in the upper cabinet 105. Also, a screen component 114 to protect the liquid crystal display panel 112 is bonded to a front case 115 by using a double-faced adhesive sheet 116.

The portable cellular phone 101 having, in addition to its original telephone conversation function, a data communication function of receiving and transmitting electronic mail and/or of being connected to the Internet to browse home pages is widely used. In the above portable cellular phone 101, for example, when a user runs a program downloaded from a site to play a game, in order to hear a voice while viewing a screen of the display section 107, the portable cellular phone 101 is used with cabinets 105, 108 being opened.

However, the conventional portable cellular phone 101 has a problem. That is, as shown in FIG. 16, when a user views a display screen of the display section 107 in a state in which the portable cellular phone 101 is folded in a compact manner with the display screen faced toward a front, the user cannot hear a voice satisfactorily since the speaker of the voice outputting section 111 is hidden. Moreover, the user, when carrying out a telephone conversation, puts the speaker section 106 to his/her ear with the cabinet being opened, however, since a voice hole of the speaker section 106 is comparatively small, it is difficult for the user to put the voice hole on the ear exactly and the portable cellular phone 101 is displaced from a position of the voice hole, which causes an insufficient amount of a voice and an unclear voice. To solve this problem, in recent years, technology is proposed to be applied to a portable cellular phone (for voice outputting from a display screen, see Non-patent reference 1: "Nikkei Business", the Nov. 1, 2004, Nikkei Business Publication Inc., p. 90) in which, for example, a screen component used to protect a display panel of a personal computer is to be used as a diaphragm making up a flat panel speaker of the portable cellular phone.

As is shown in FIG. 18, a flat panel speaker 201 employed in the conventional portable cellular phone 101 is mounted in a cabinet having a display section and is made of a transparent material of, for example, an acrylic resin and includes a diaphragm 202 also serving as a screen component to protect the liquid crystal display panel and an actuator module 203 having a piezo-electric element which vibrates the diaphragm 202 for emission of sound waves.

The diaphragm 202, as shown in FIG. 19, in its specified portion, is attached to the actuator module 203 so that vibration is transferred from the actuator module 203 in a manner in which the diaphragm 202 strikes the actuator module 203 to come into physical contact and also is attached to the front case 206 making up another cabinet and having an aperture 206a in its central portion to expose a display screen of the liquid crystal display panel with a frame-shaped gasket member 204 used to prevent the entry of a foreign matter such as dust or a like interposed between the diaphragm 202 and the front case 206. The gasket member 204 is placed so that its inner wall face 204 faces the aperture 206a of the front case 206 and is bonded to the diaphragm 202 by using the frame-like double-faced adhesive sheet and to an edge of the aperture 206a of the front case 206 also by using the frame-like double-faced adhesive sheet.

The problem to be solved is that the gasket member 204 is deformed due to secular changes which causes a function of preventing dust entry to be degraded and the resulting deformation interferes with, for example, a liquid crystal display panel 112 placed on an inner side (on a central portion side of the aperture) causing damage. That is, as shown in FIG. 20, the gasket member 204 deteriorates and is deformed to a degree to which the gasket member 204 is made flat (in a manner in which its thickness decreases and its width increases) making it impossible to perform the satisfactory dustproof function and, in addition, a portion extended inside, in particular, comes into contact with the liquid crystal panel 205 causing damage.

SUMMARY OF THE INVENTION

In view of the above, it is an object of the present invention to provide a dustproof structure (dust entry preventing structure) and a dust entry preventing method employed in an electronic device which is capable of reliably suppressing deformation caused by deterioration of a gasket member to maintain a dustproof function (dust entry preventing function) and of avoiding interference with components mounted within the electronic device.

According to a first aspect of the present invention, there is provided a dustproof structure in an electronic device including:

a cap-like component attached to a cabinet of the electronic device in which an aperture is formed, with a gasket member placed at an edge of the aperture interposed between the cabinet and the cap-like component in a manner in which the cap-like component covers the aperture; and a gasket member pressing unit placed on a rear side of the cap-like component that faces an inside of the cabinet and having a facing portion that faces at least a partial portion of a side wall face of the gasket member and, when the side wall face is displaced, comes into contact with at least the partial portion of the side wall face to press the gasket member.

In the foregoing, a preferable mode is one wherein the gasket member pressing unit suppresses deformation attributed to a decrease in thickness and/or an increase in width by secular changes in the gasket member.

Also, a preferable mode is one wherein the gasket member includes an approximately flat and frame-shaped component to support the cap-like component and is placed in a manner in which an inner wall face of the gasket member faces the aperture and wherein the gasket pressing unit has a stopping unit to stop displacement, which is attributed to the increase in the width of the gasket member, of the inner wall face toward a central portion of the aperture, by pressing the inner wall face.

Also, a preferable mode is one wherein the electronic device includes a functional unit having a specified function and wherein a holding base unit to hold the functional unit on a side being opposite to a side on which the cap-like component of the aperture is placed and wherein the stopping unit is mounted in an extruded state on the aperture side of the holding base unit and has an outer wall face being opposite to the inner wall face.

Also, a preferable mode is one wherein the stopping unit is placed in an extruded state at an edge on the cap-like component side of the aperture and has an outer wall face being opposite to the inner wall face.

Also, a preferable mode is one wherein the electronic device has a flat speaker panel which makes an actuator vibrate a diaphragm for emission of sound waves and wherein the cap-like component also serves as the diaphragm and wherein the gasket member supports the cap-like component in a state being bonded to the cap-like component while being deformed in a manner to correspond to vibration of the cap-like component at least along a direction of a thickness.

Also, a preferable mode is one wherein the actuator has a piezo-electric element and is in contact with a specified portion of the cap-like component.

Also, a preferable mode is one wherein the functional unit includes a display unit to display character information and/or image information and wherein the cap-like component is made of a transparent material and is used to protect a display screen.

Also, a preferable mode is one wherein the outer wall face is formed consecutively and intermittently along and around the inner wall face.

Furthermore, a preferable mode is one wherein the gasket member is used to prevent the entry of a foreign matter including at least dust into the cabinet from the aperture.

According to a second aspect of the present invention, there is provided an electronic device having a dustproof structure which includes:

a cap-like component attached to a cabinet of the electronic device in which an aperture is formed, with a gasket member placed at an edge of the aperture interposed between the cabinet and the cap-like component in a manner in which the cap-like component covers the aperture; and a gasket member pressing unit placed on a rear side of the cap-like component that faces an inside of the cabinet and having a facing portion that faces at least a partial portion of a side wall face of the gasket member and, when the side wall face is displaced, comes into contact with at least the partial portion of the side wall face to press the gasket member.

In the foregoing aspect, a preferable mode is one that wherein is provided with a flat speaker panel which makes an actuator vibrate a diaphragm for emission of sound waves and wherein the cap-like component also serves as the diaphragm and wherein the gasket member supports the cap-like component in a state being bonded to the cap-like component while being deformed in a manner to correspond to vibration of the cap-like component at least along a direction of a thickness.

According to a third aspect of the present invention, there is provided a dust entry preventing method employed in an electronic device in which a cap-like component is attached to a cabinet in which an aperture is formed, with a gasket member interposed between the cap-like component and the cabinet, in a manner in which the cap-like component covers the aperture, the method including:

a step of mounting the gasket member pressing unit placed on a rear side of the cap-like component that faces an inside of the cabinet and having a facing portion that faces at least a partial portion of a side wall face of the gasket member to press the gasket member;

wherein the facing portion of the gasket member pressing unit, when the side wall face of the gasket member is displaced, comes into contact with at least a partial portion of the side wall face to press the gasket member so that deformation caused by changes in a dimension and shape of the gasket member is suppressed.

With the above configurations, when a side wall face of the gasket member is displaced, the facing portion of the gasket pressing means comes into physical contact with at least a partial portion of the side wall face of the gasket member to press the gasket member and, therefore, the deformation of the gasket member caused by its deterioration can be suppressed to maintain a dustproof function and of avoiding interference with components mounted within an electronic device.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

An object of the present invention that, when a side wall face of a gasket member is displaced, deformation caused by deterioration of a gasket member is reliably suppressed to maintain a dustproof function (dust entry preventing function) and to avoid interference with components mounted within an electronic device is achieved by making a facing portion of a gasket pressing means come into physical contact with at least a partial portion of the side wall face of the gasket member.

Embodiment

Figure 1:
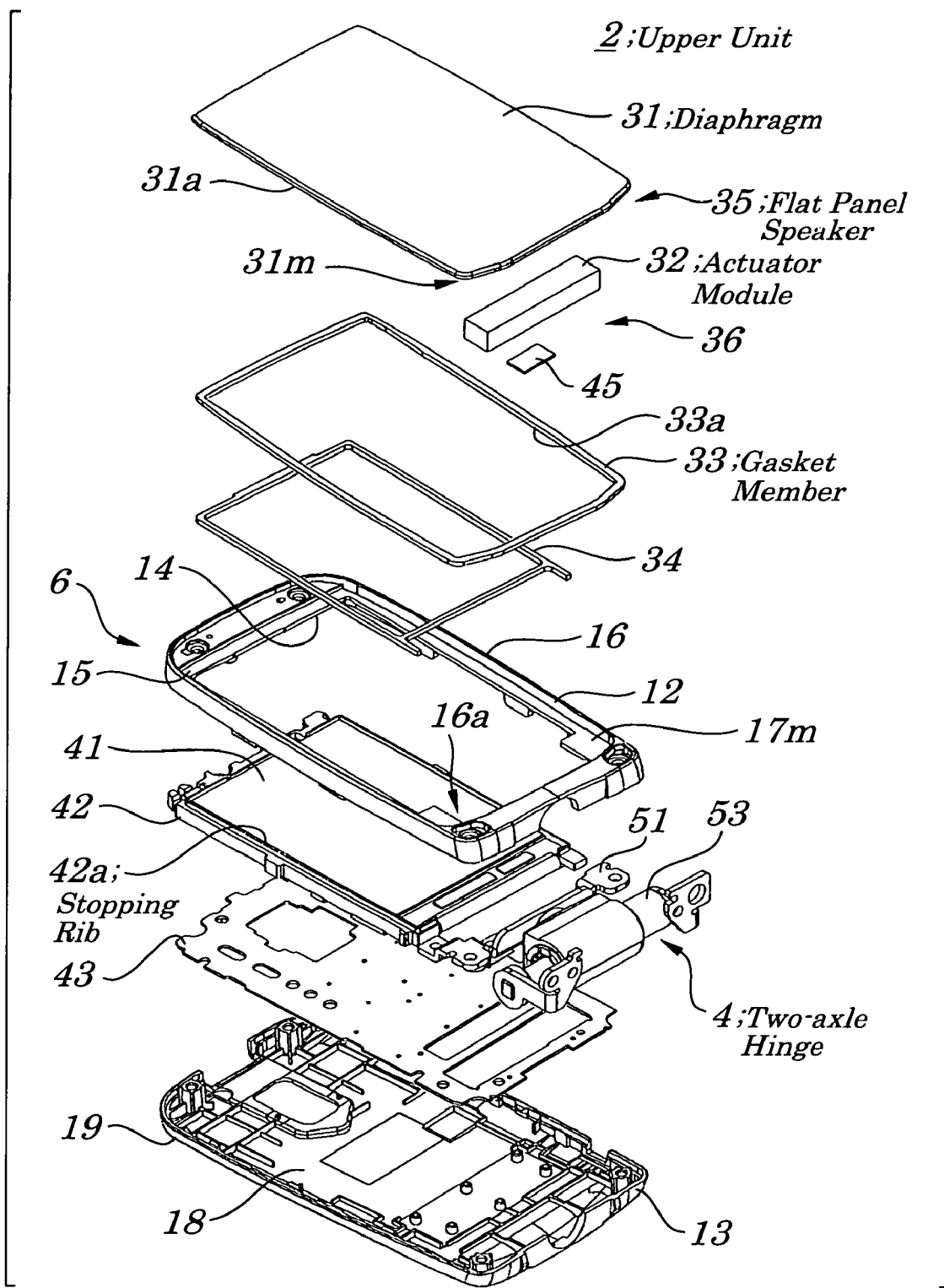
FIG. 1 is an exploded perspective view showing configurations of an upper unit obtained by disassembling the upper unit of a portable cellular phone and by viewing the upper unit from its surface side according to an embodiment of the present invention.
Figure 2:
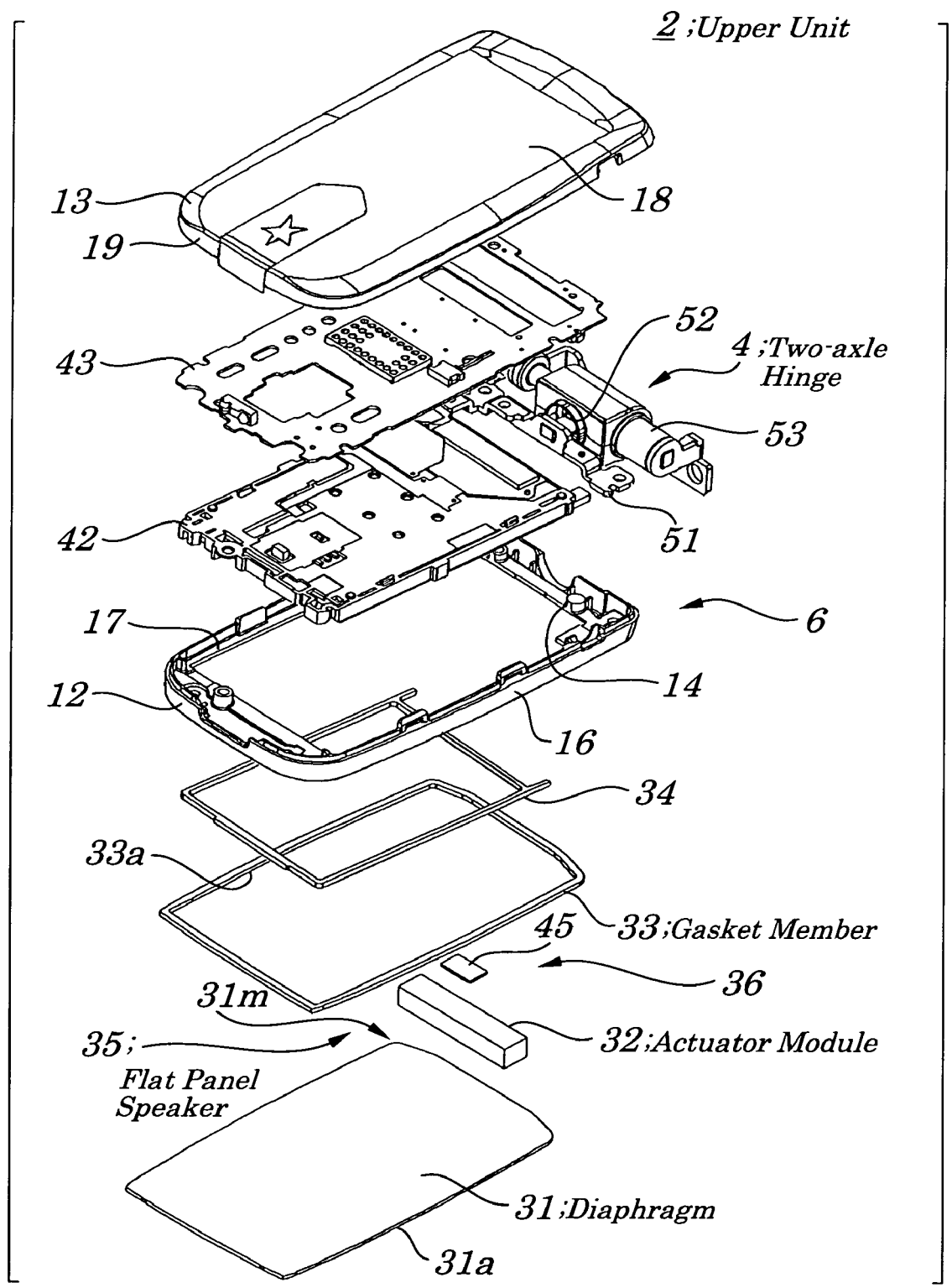
FIG. 2 is another exploded perspective view for showing configurations of the upper unit obtained by disassembling the upper unit of the portable cellular phone and by viewing the upper unit from its rear side according to the embodiment of the present invention.
Figure 3:
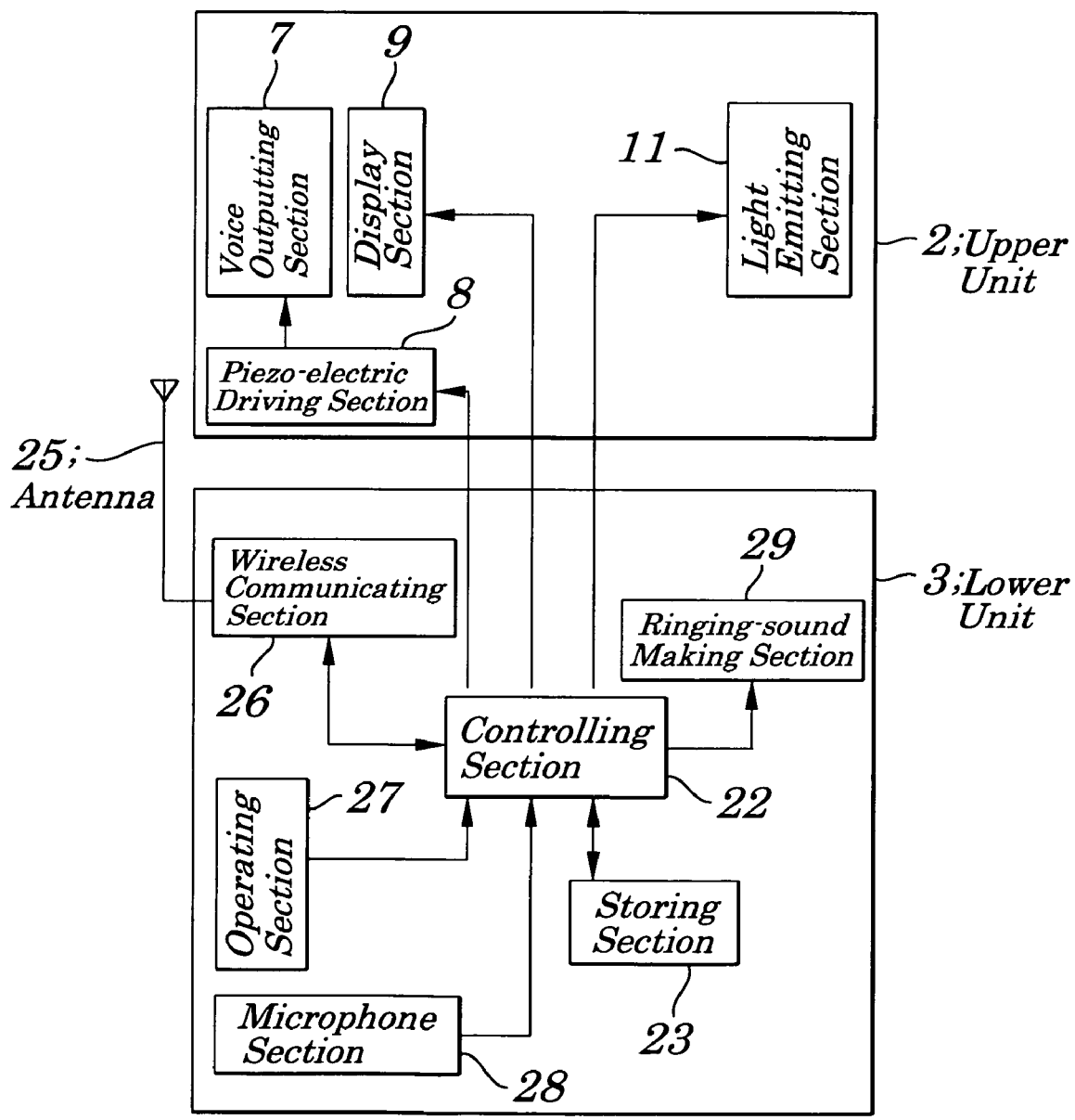
FIG. 3 is a block diagram showing configurations of the portable cellular phone of according to the embodiment of the present invention.
Figure 4:
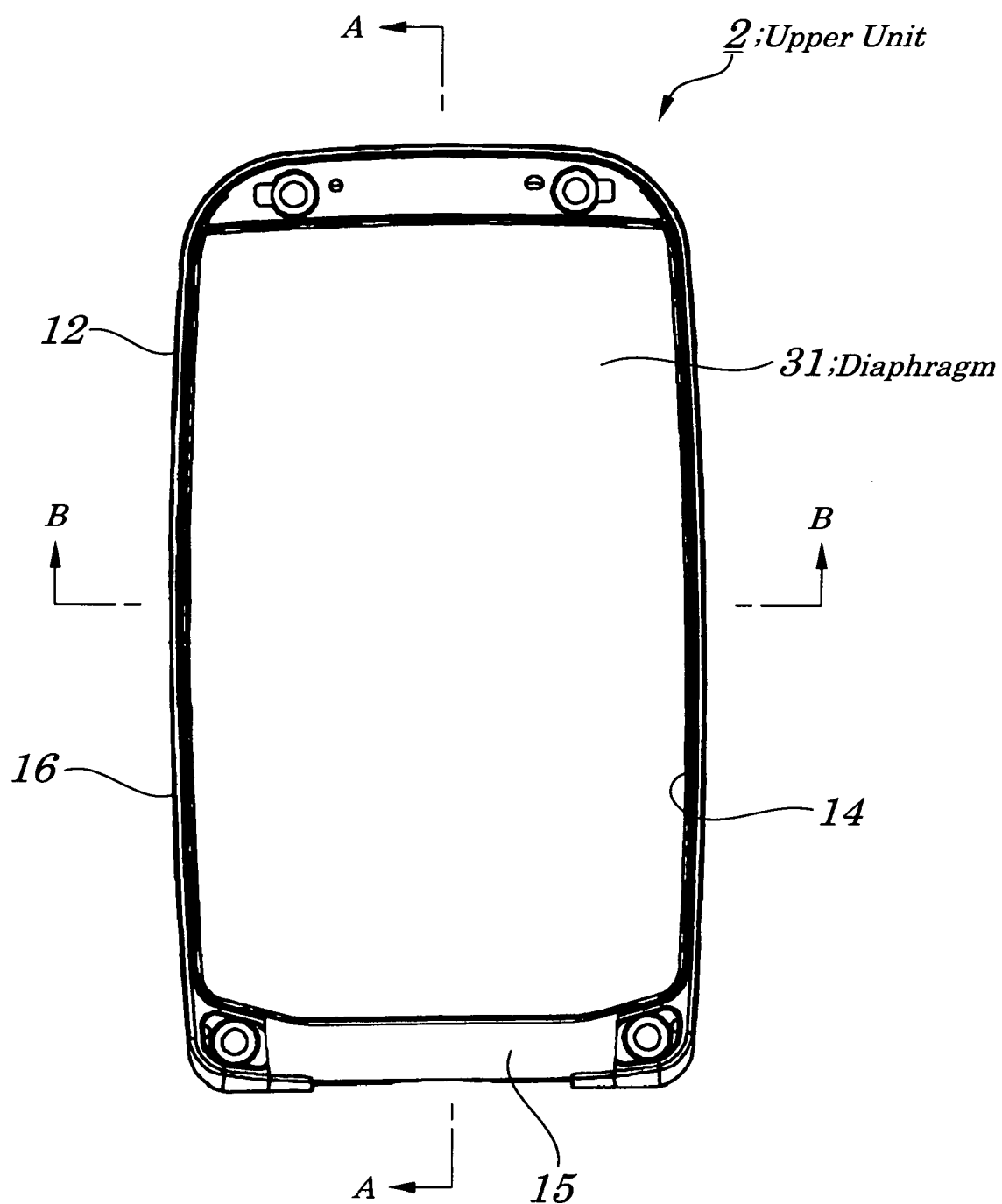
FIG. 4 is a plan view showing configurations of the upper unit of the portable cellular phone according to the embodiment of the present invention.
Figure 5:
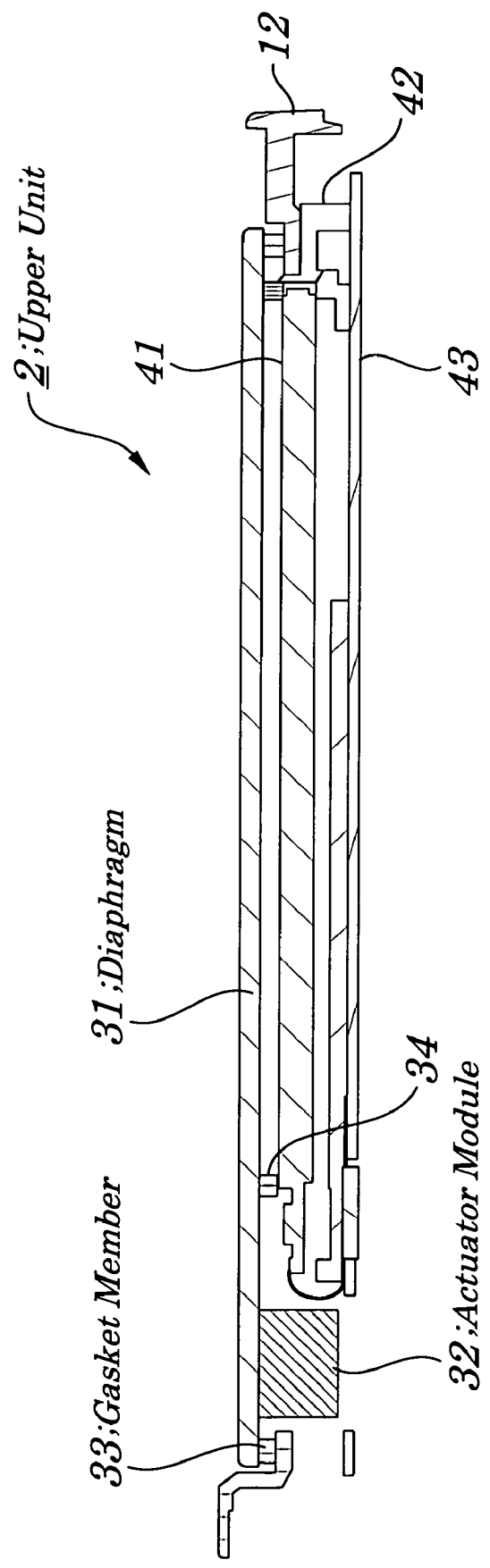
FIG. 5 is a cross-sectional view of the upper unit, taken along a line A-A of FIG. 4.
Figure 6:
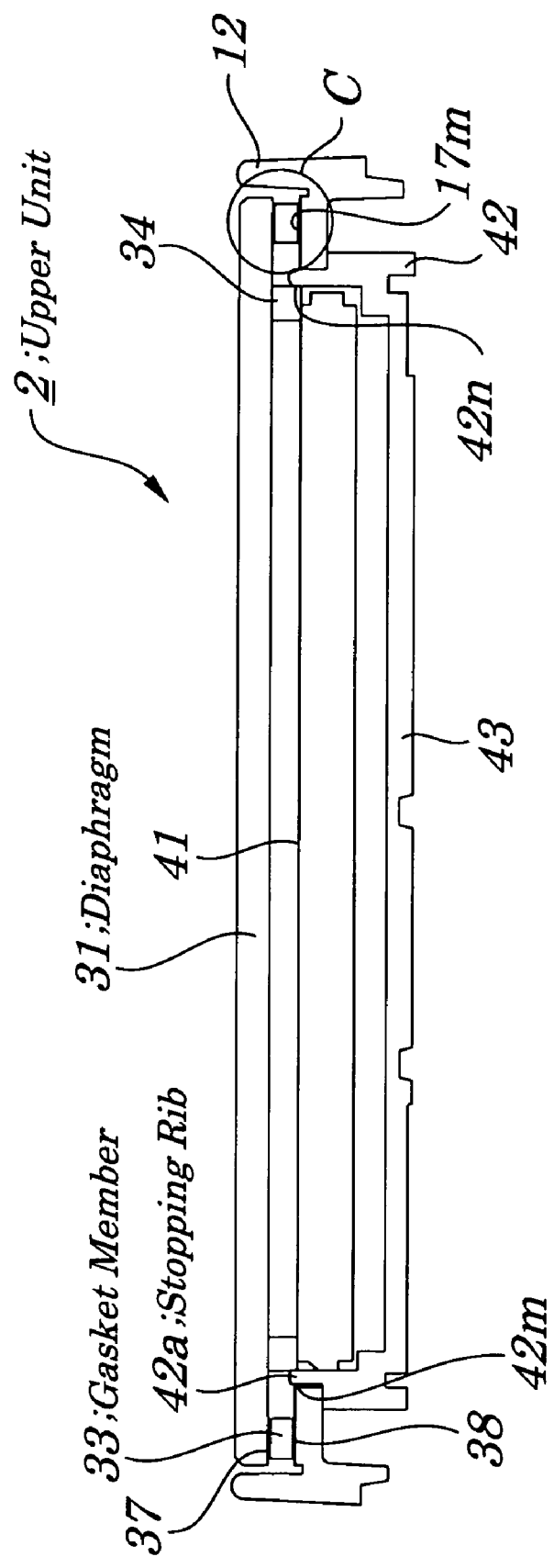
FIG. 6 is another cross-sectional view of the upper unit, taken along a line B-B of FIG. 4.
Figure 7:
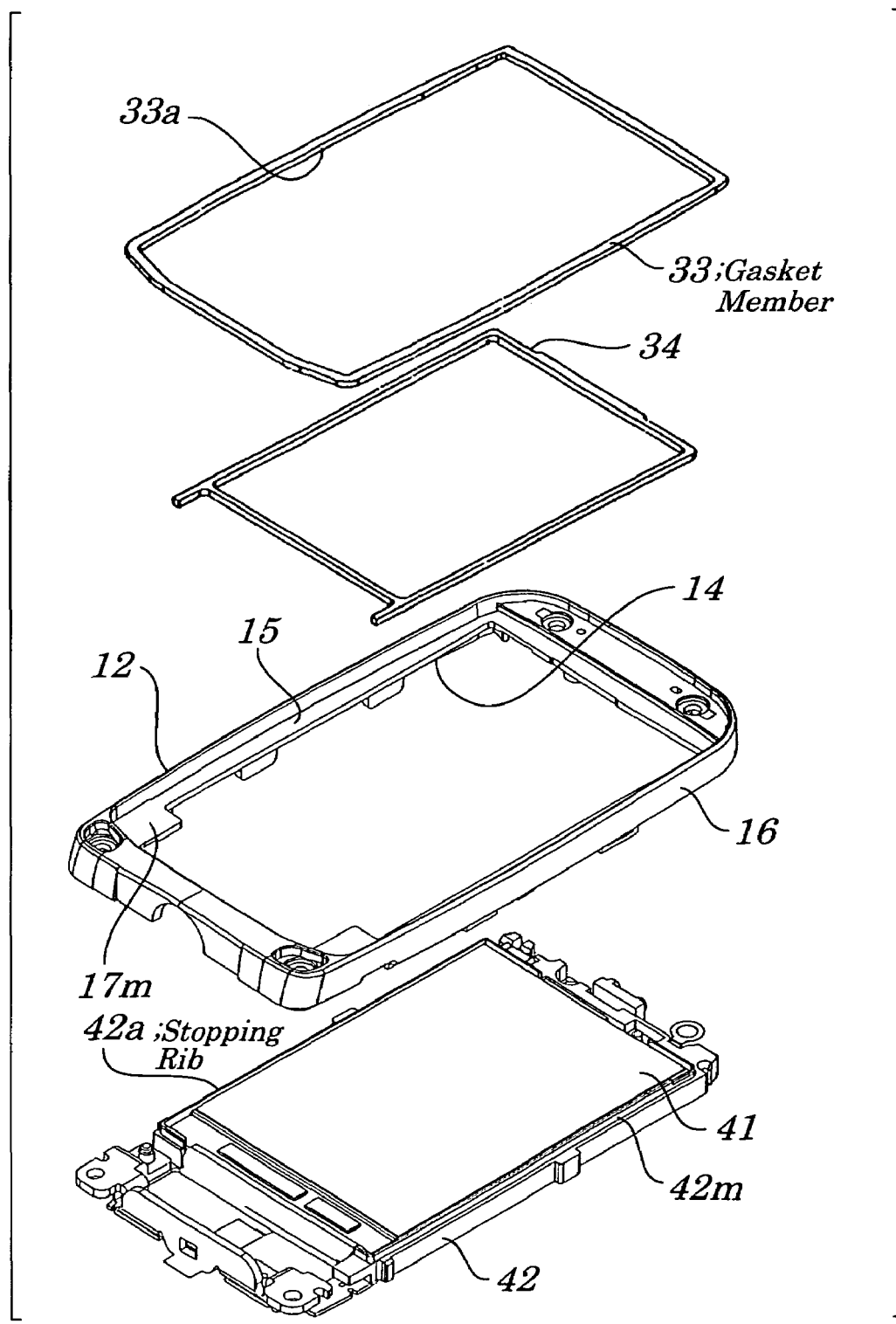
FIG. 7 is an exploded perspective view to explain a method of attaching a gasket member of a voice outputting section and a dust entry preventing cushion component in the portable cellular phone according to the embodiment of the present invention.
Figure 8:
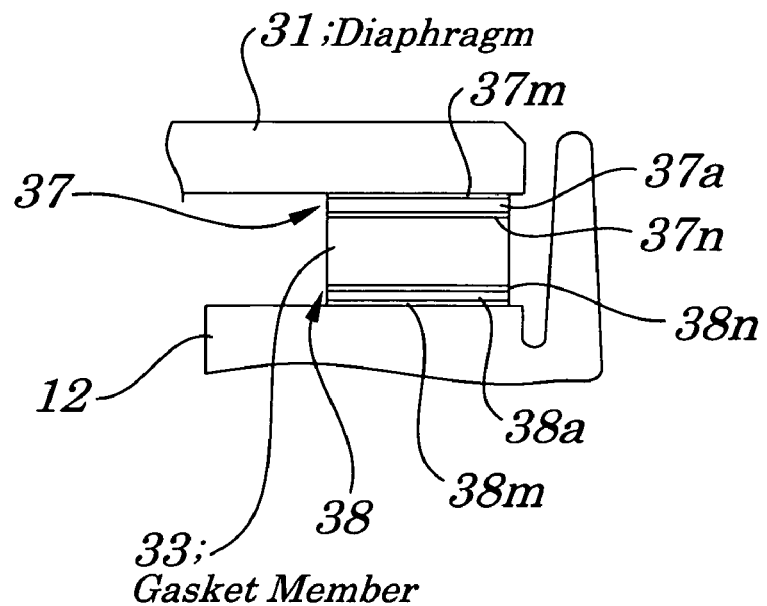
FIG. 8 is an enlarged cross-sectional view showing a portion "c" of FIG. 6.
Figure 9:
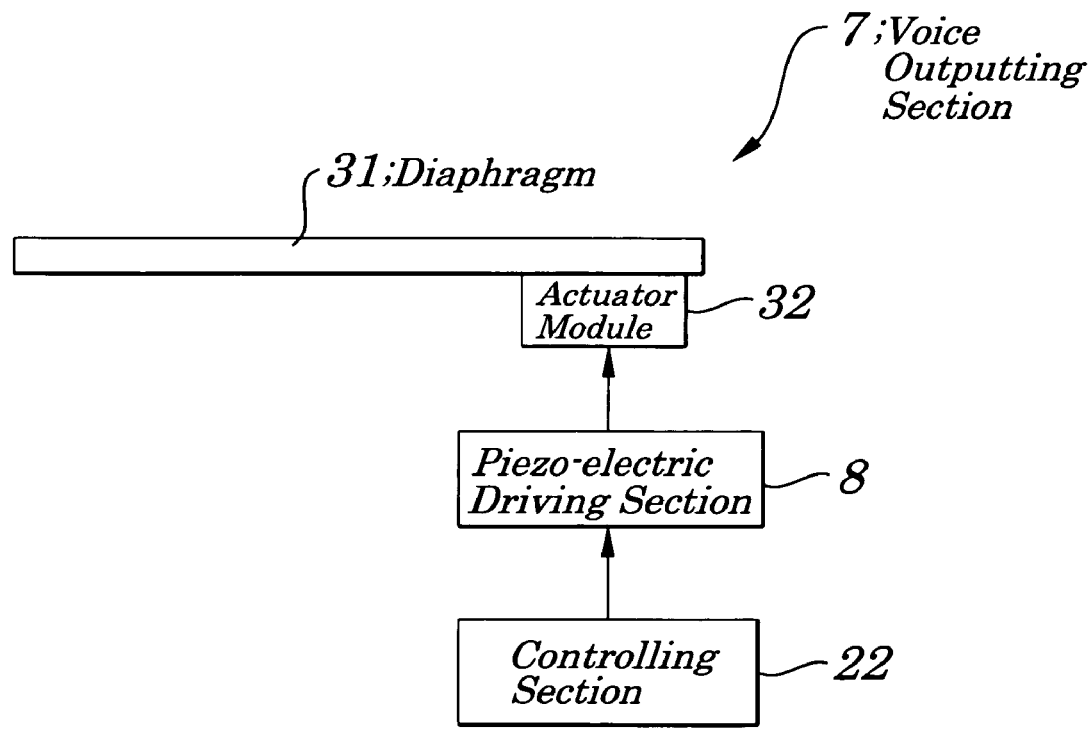
FIG. 9 is a block diagram showing configurations of the voice outputting section according to the embodiment of the present invention.
Figure 10:
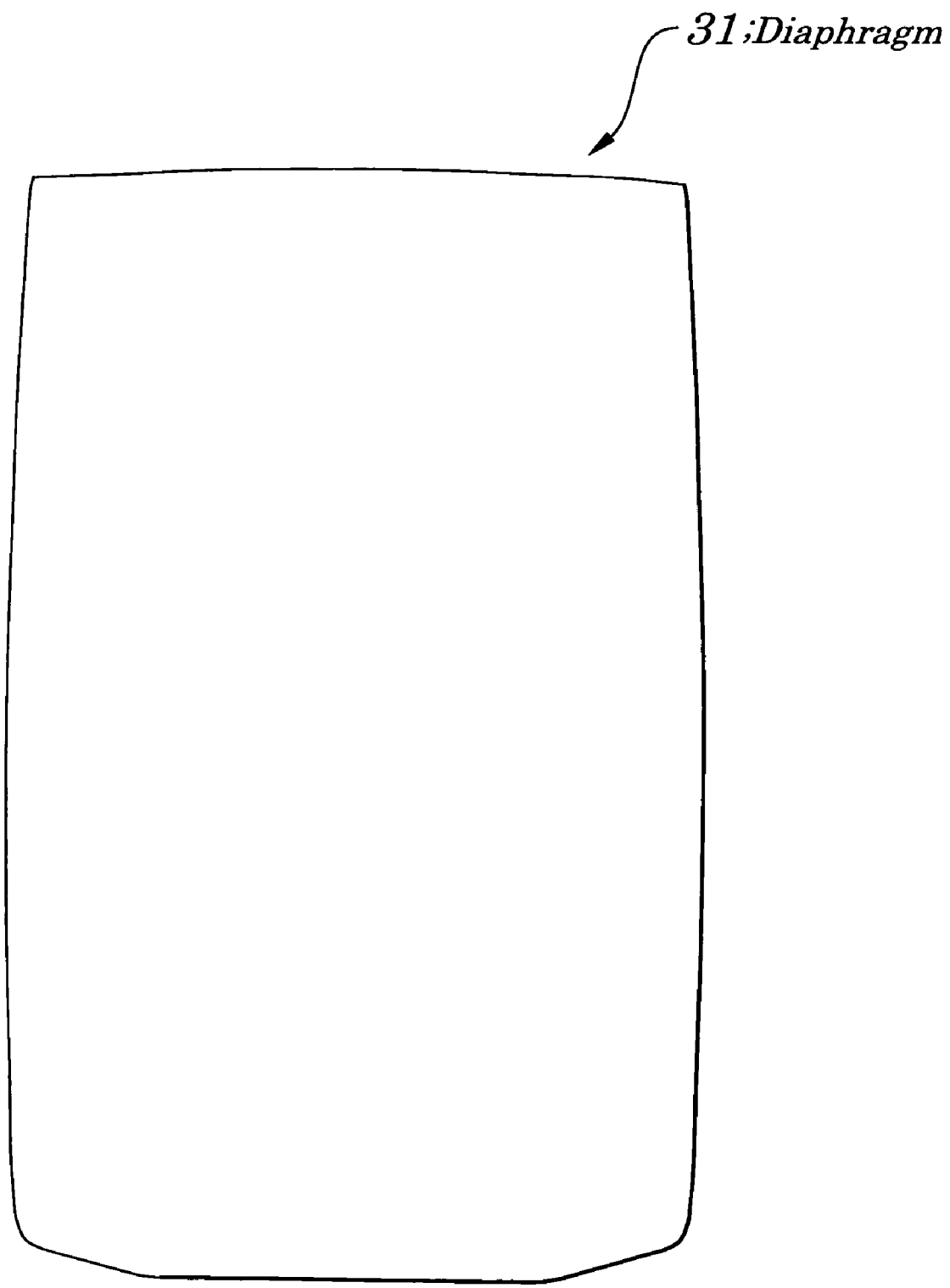
FIG. 10 is a plan view showing configurations of a diaphragm of the voice outputting section in the portable cellular phone according to the embodiment of the present invention.
Figure 11:
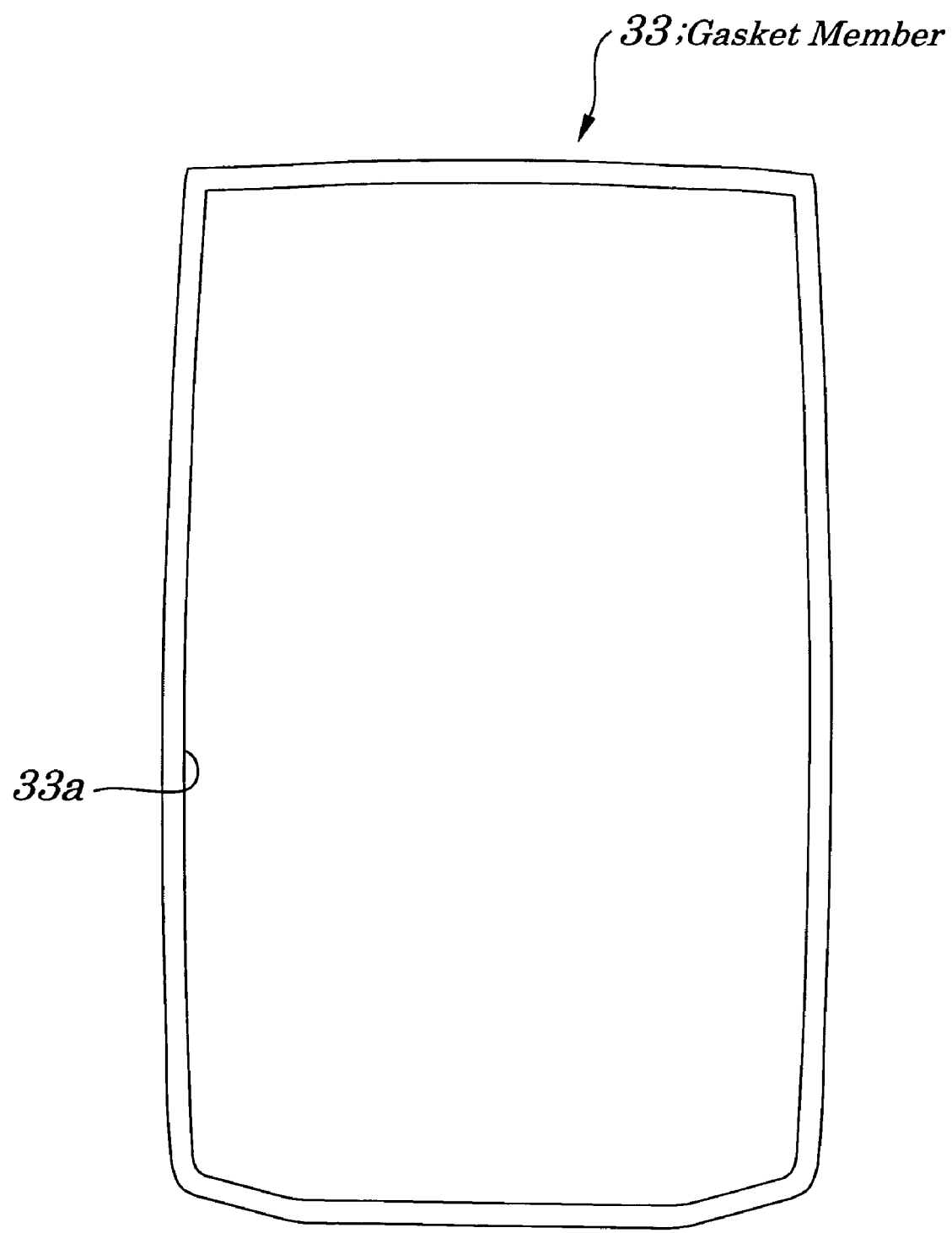
FIG. 11 is a plan view showing the gasket member in the portable cellular phone according to the embodiment of the present invention.
Figure 12:
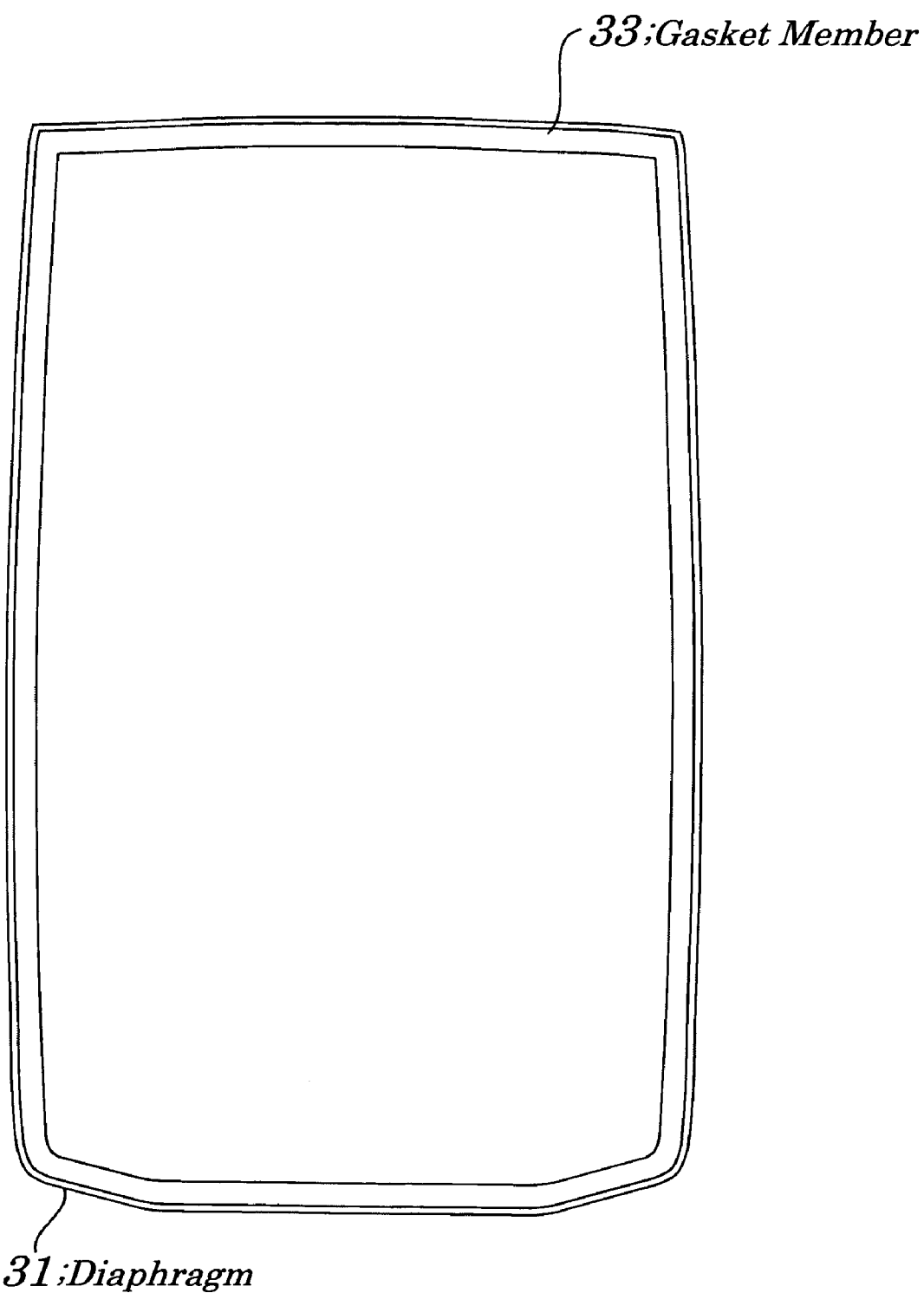
FIG. 12 is a bottom view showing a state in which the gasket member is attached to the diaphragm in the portable cellular phone according to the embodiment of the present invention.
Figure 13:
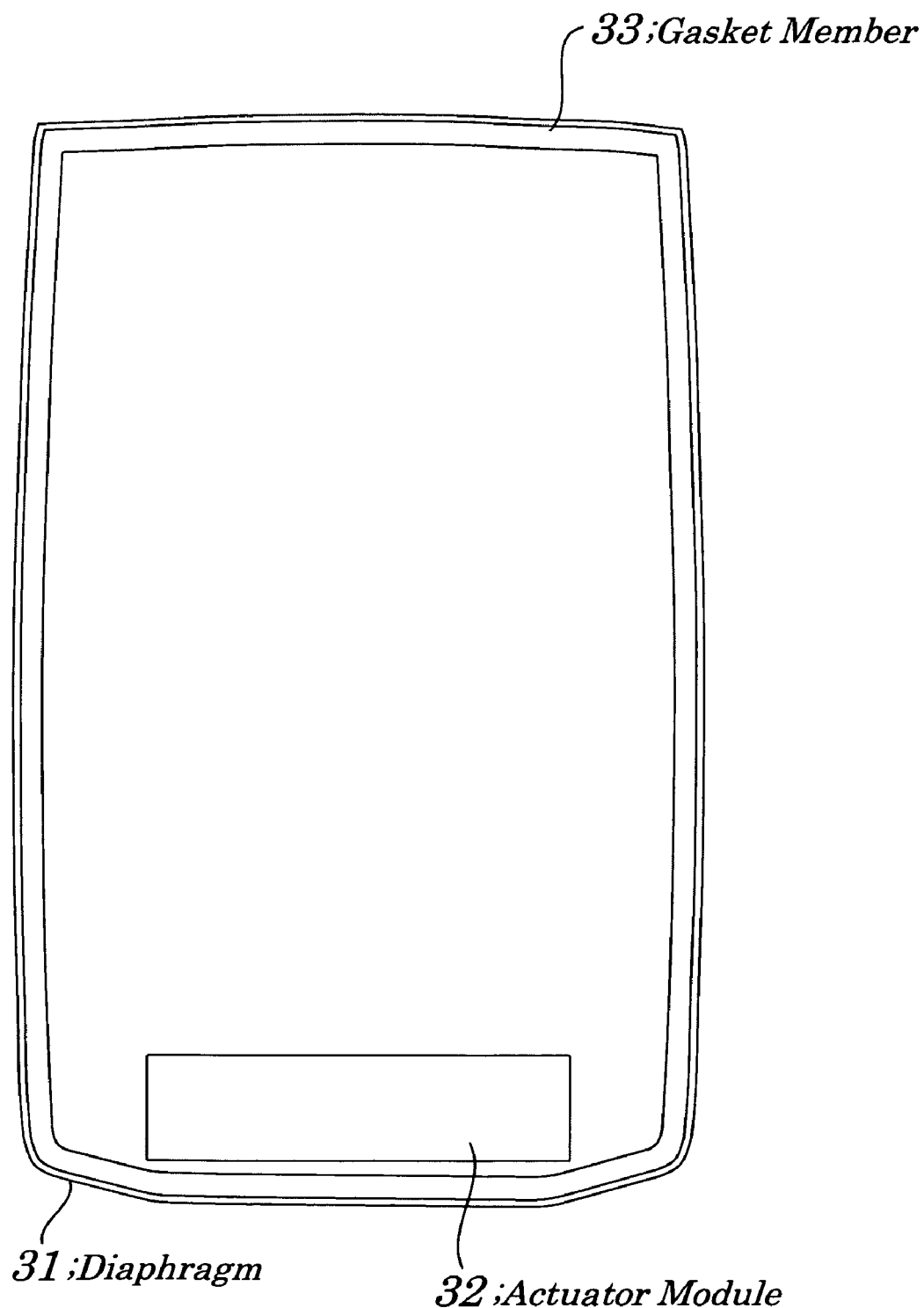
FIG. 13 is another bottom view showing a state in which the gasket member and actuator module are attached to the diaphragm in the portable cellular phone according to the embodiment of the present invention.
Figure 14:
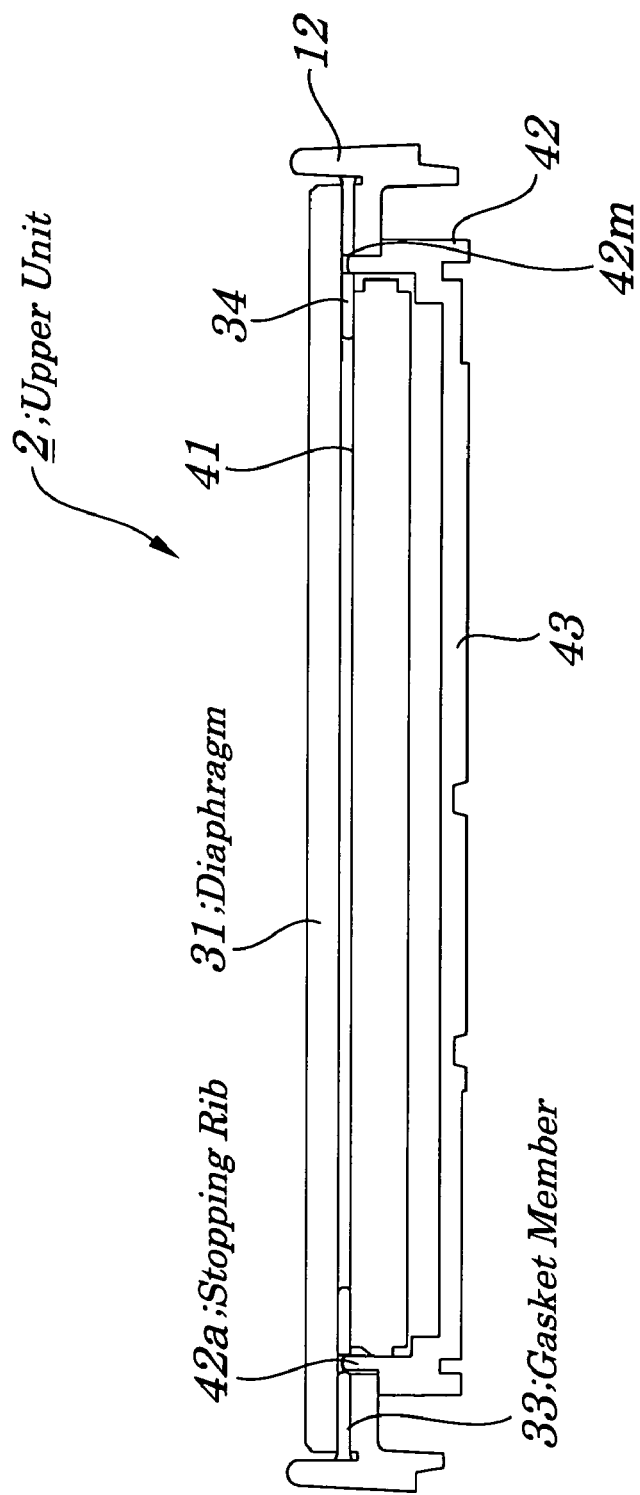
FIG. 14 is a diagram explaining a function of a deformation preventing rib employed in the embodiment of the present invention.
Figure 15:
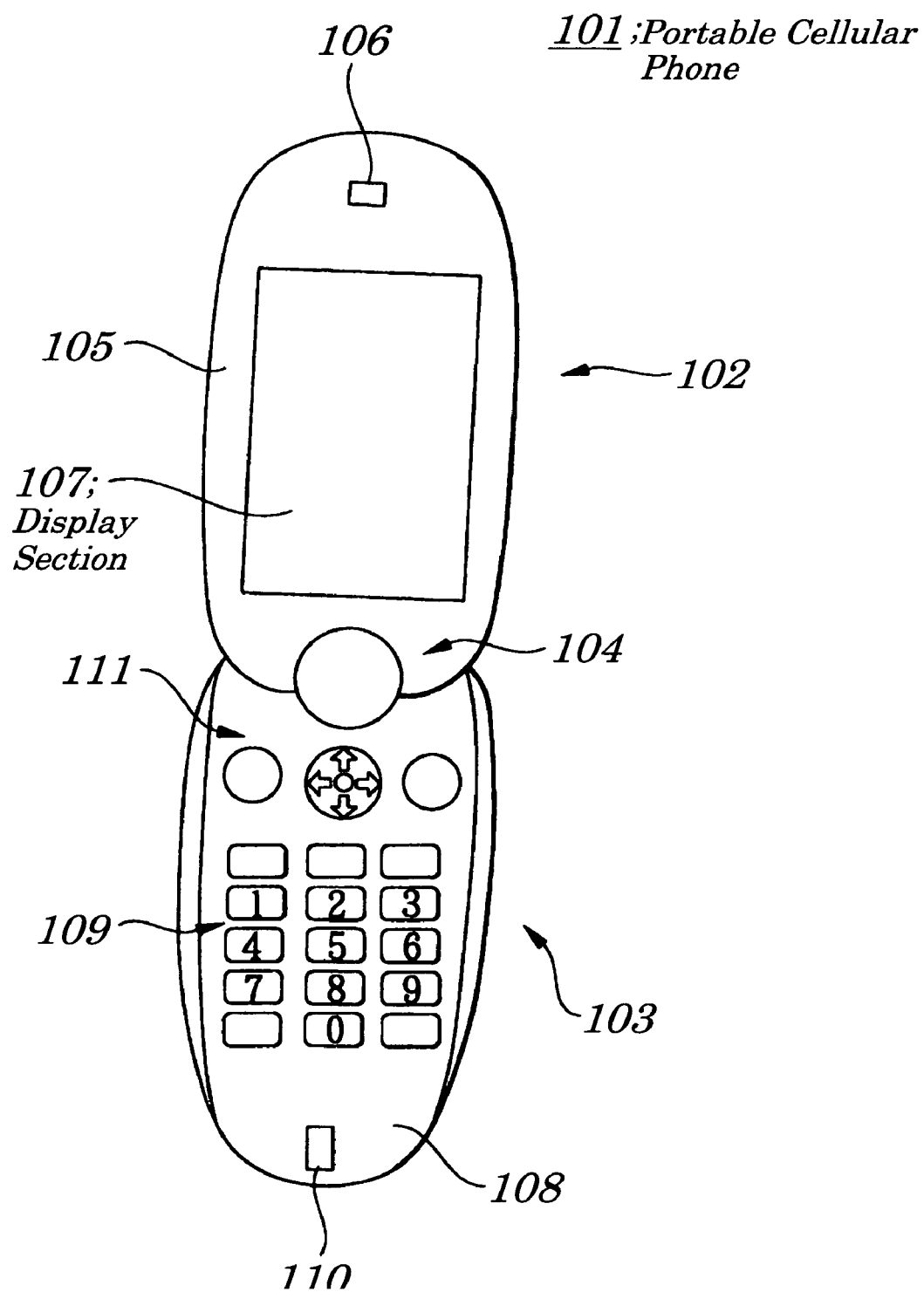
FIG. 15 is a diagram to explain conventional technology.
Figure 16:
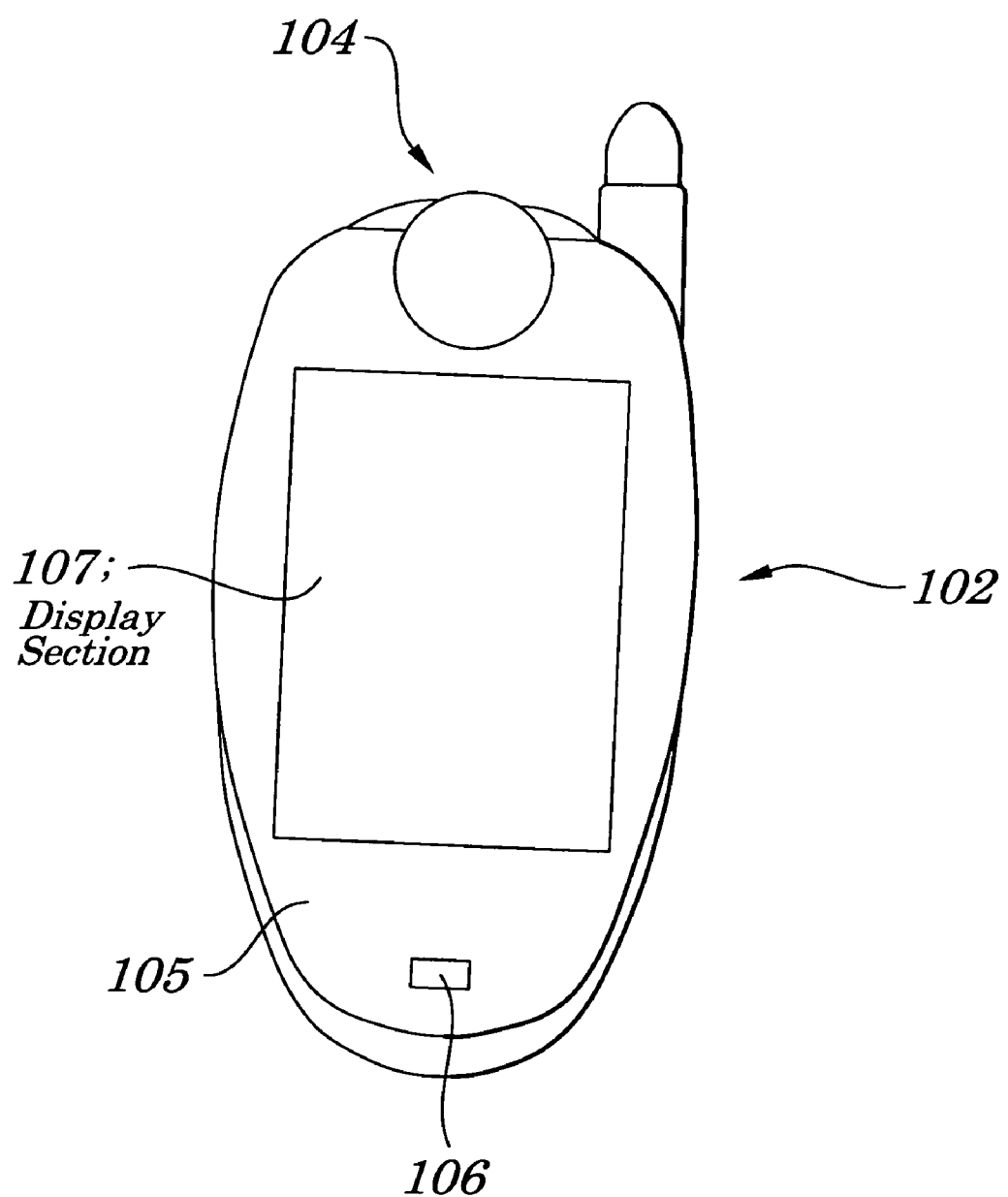
FIG. 16 is also a diagram to explain the conventional technology.
Figure 17:
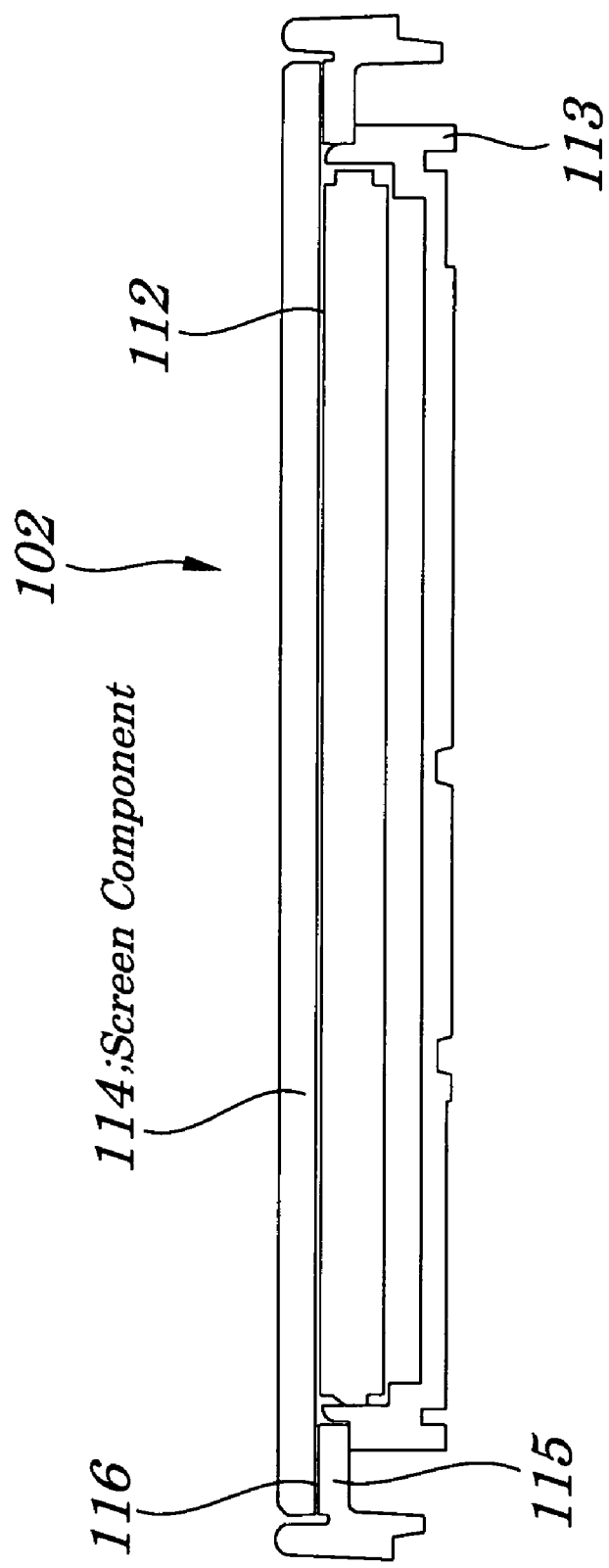
FIG. 17 is also a diagram to explain the conventional technology.
Figure 18:
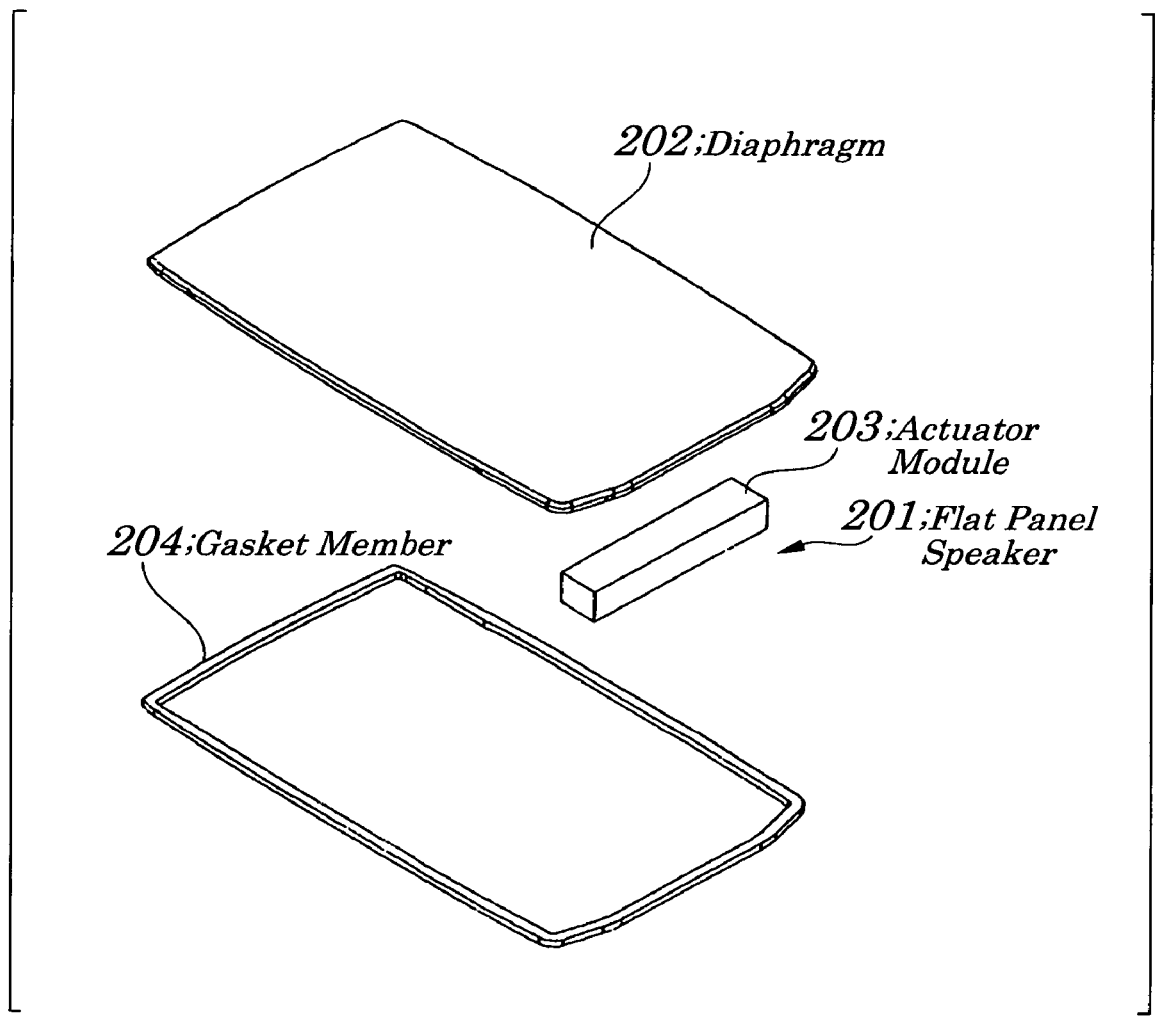
FIG. 18 is also a diagram to explain the conventional technology.
Figure 19:
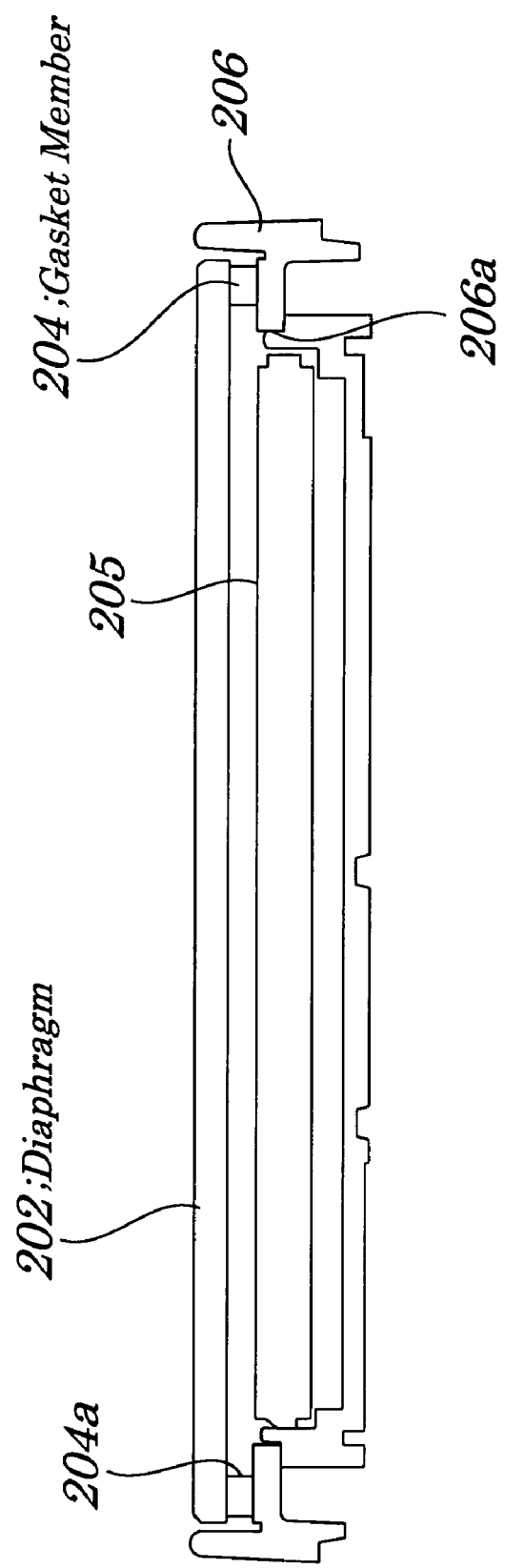
FIG. 19 is also a diagram to explain the conventional technology.
Figure 20:
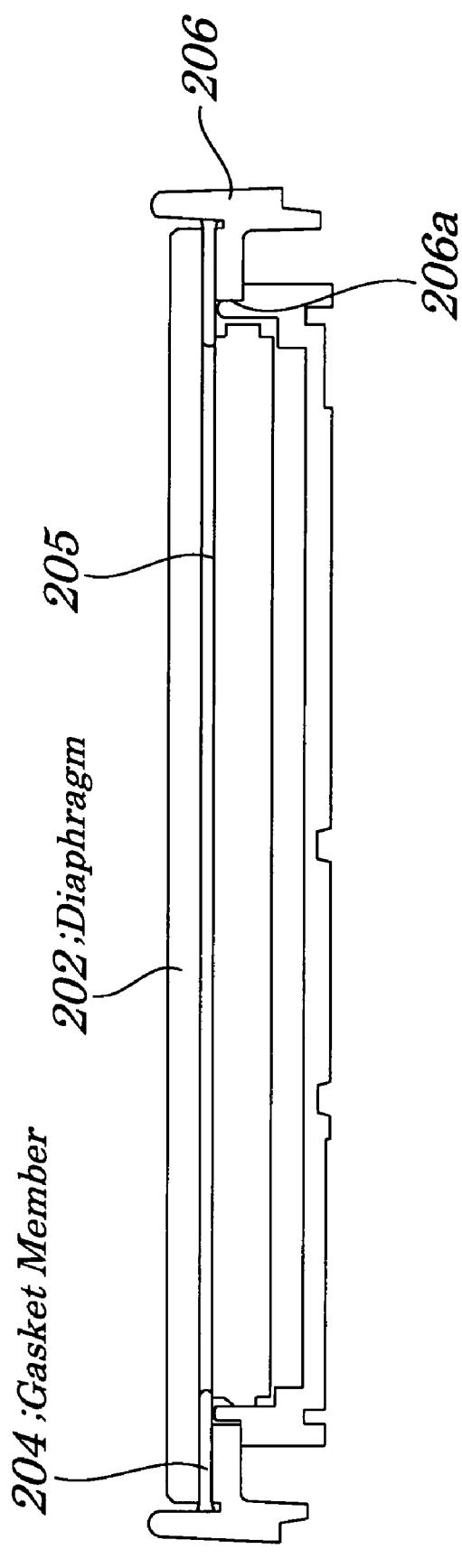
FIG. 20 is also a diagram to explain the conventional technology.

FIG. 1 is an exploded perspective view for showing configurations of an upper unit 2 obtained by disassembling the upper unit 2 of a portable cellular phone 1 and by viewing the upper unit 2 from its surface side according to an embodiment of the present invention. FIG. 2 is another exploded perspective view showing configurations of the upper unit 2 obtained by disassembling the upper unit 2 of the portable cellular phone 1 and by viewing the upper unit 2 from its rear side according to the embodiment. FIG. 3 is a block diagram showing configurations of the portable cellular phone 1 of the embodiment. FIG. 4 is a plan view showing configurations of the upper unit 2 of the portable cellular phone 1 according to the embodiment. FIG. 5 is a cross-sectional view of the upper unit 2, taken along a line A-A of FIG. 4. FIG. 6 is a cross-sectional view of the upper unit 2, taken along a line B-B of FIG. 4. FIG. 7 is an exploded perspective view to explain a method of attaching a gasket member 33 of a voice outputting section 7 and a dust entry preventing cushion component 34 in the portable cellular phone 1 according to the embodiment. FIG. 8 is an enlarged cross-sectional view showing a portion "C" of FIG. 6. FIG. 9 is a block diagram showing configurations of the voice outputting section 7 according to the embodiment. FIG. 10 is a plan view showing configurations of a diaphragm 31 of the voice outputting section 7 in the portable cellular phone 1 according to the embodiment. FIG. 11 is a plan view showing the gasket member 33 in the portable cellular phone 1 according to the embodiment. FIG. 12 is a bottom view showing a state in which the gasket member 33 is attached to the diaphragm 31 in the portable cellular phone 1 according to the embodiment. FIG. 13 is a bottom view showing a state in which the gasket member 33 and an actuator module 32 are attached to the diaphragm 31 in the portable cellular phone 1 according to the embodiment. FIG. 14 is a diagram explaining a function of a deformation preventing rib (stopping rib 42a) employed in the embodiment.

The portable cellular phone 1 according to the embodiment has, in addition to an original function of carrying out a telephone conversation, a data communication function of enabling electronic mail to be received and transmitted and of being connected to the Internet to allow home pages to be browsed. Also, the portable cellular phone 1 is so configured as to include foldable cabinets, as shown in FIGS. 1 to 3, and that the upper unit 2 and a lower unit 3 can be opened and closed freely in conjunction with each other and that the upper unit 2 and the lower unit 3 are connected via a two-shaft hinge 4 in a manner in which one unit (for example, upper unit 2) is allowed to rotate freely relative to another unit (lower unit 3) in a portion surrounding one rotational shaft placed in a direction perpendicular to another rotational shaft for closing and opening of the portable cellular phone 1.

The upper unit 2 is roughly configured, as shown in FIGS. 1 to 3, so as to include the voice outputting section 7 to output, for example, a receiving voice, a piezo-electric driving section 8 to drive the voice outputting section 7, a display section 9 made up of a liquid crystal display device on which a function setting screen, standby screen, or a like are displayed, and a light emitting section 11 having an LED (Light Emitting Diode) to emit light, for example, when an incoming call arrives or while a telephone conversation is being carried out, all being mounted on the portable cellular phone 1 upper cabinet 6 making up a foldable and flat cabinet. The upper cabinet 6 is made of a die-casting formed product of, for example, alloys of magnesium and has a front case 12 making up a front side portion and a rear cover 13 making up a rear side portion. The front case 12 and the rear cover 13 are assembled in combination, in the inside of which the voice outputting section 7, the display section 9, the light emitting section 11 are housed, both being fitted in or fastened by a fixing element such as a female screw, male screw, or a like.

The front case 12 is roughly configured so as to have a rectangular plate 15 in the central portion of which an aperture 14 to expose a display screen of the liquid crystal display panel 41 is formed with a side-wall 16 mounted in a circumferential portion of the rectangular plate 15 in a standing state. On a surface of an edge 17 of the aperture 14 is placed, in a protruded state, in a side portion (in the inside portion) on an inner wall side of the side-wall 16 of the rectangular plate 15 is formed a putting-face 17m used to put the diaphragm 31 with the gasket member 33 described later being interposed between the rectangular plate 15 and the diaphragm 31. Moreover, the rear cover 13 is so configured that a side wall 19 is placed in a standing manner in a portion surrounding a rectangular plate 18.

The lower unit 3 is roughly configured so that, on the foldable and flat lower cabinet are mounted, as shown in FIG. 3, a controlling section 22 to control each component making up the portable cellular phone 1 proper, a storing section 23 to store processing programs to be run by the controlling section 22 and/or various data or a like, a wireless communicating section 26 to receive and transmit radio waves through an antenna 25 and to carry out a telephone conversation and data communication according to a specified protocol, an operating section 27 made up of many various operation keys to input numerals and/or characters, a transmitting voice, and a ringing-sound making section 29 to generate an incoming call at time of arrival of the incoming call.

The voice outputting section 7, as shown in FIGS. 1 to 13, is made of a transparent material of, for example, an acrylic resin, and is so configured as to include the diaphragm 31 also serving as a screen component to protect the liquid crystal display panel 41, the actuator module 32 having a piezo-electric element to vibrate the diaphragm 31 to make sound waves be emitted, a flat and the frame-shaped gasket member 33 made of, for example, silicone rubber and to prevent the entry of the foreign matter such as dust or a like into the inside of the upper cabinet 6, the dust entry preventing cushion component 34 placed inside of the gasket member 33 and made of, for example, urethane foam having a shape of a frame to prevent the entry of dust into the into the inside which also avoids adhesion of the dust to the surface of the liquid crystal display panel 41. Here, the diaphragm 31 and the actuator module 32 make up a flat panel speaker 35.

The actuator module 32 receives an amplified driving signal through the piezo-electric driving section 8 to be controlled by the controlling section 22 and converts the driving signal being an electric signal into an acoustic signal to vibrate the diaphragm 31. In the embodiment, the actuator module 32 is bonded to a specified portion of a rear of the diaphragm 31 by using a double-faced adhesive tape. Moreover, on the rear side of the actuator module 32 is placed a cushion material 45 to protect an FPC (Flexible Printed Circuit). In an external area of an area corresponding to a display screen region of the diaphragm, a light shielding material is applied. The dust entry preventing cushion component 34 is placed inside of the gasket member 33 (in the embodiment, within a clearance space where a side portion of the gasket member 33 is surrounded by an inner wall face 33a of the gasket member 33 and an upper portion is covered by the diaphragm 31 and in a lower portion of the gasket member 33 is placed the liquid crystal display panel 41) so that a circumference portion of a display screen region is surrounded. In the embodiment, positioning is performed on the diaphragm 31 so that a specified rectangular portion 31m of a side wall 31a strikes a corresponding corner portion 16a formed on the aperture 14 side of the side wall of the front case 12 to come into physical contact and is placed on the putting-face 17m with the gasket member 33 interposed between the diaphragm 31 and the front case 12. As shown in the FIGS. 6, 7 and 8, the gasket member 33 is bonded to the diaphragm 31 by a double-faced adhesive sheet 37 and to the putting-face 17m of the front case 12 by a double-faced adhesive sheet 38.

The double-faced adhesive sheets 37 (38), as shown in FIG. 8, includes a base body 37a (38a) and a silicone adhesive layer 37n (38n) formed on another face of the base body 37a (38a). The diaphragm 31 is attached to the front face 12 with the gasket member 33 interposed between the diaphragm 31 and the front case 12. The gasket member 33, while being bonded to the diaphragm 31, supports the diaphragm 31, in a manner to respond to the vibration of the diaphragm 31, at least along a direction of thickness and prevents entry of water, in particular, into the upper cabinet 6 from the aperture 14. Moreover, outer dimensions of the gasket member 33 are set to be somewhat smaller than those of the diaphragm 31.

In the method of mounting the flat panel speaker 35, as shown in FIGS. 5 to 7, the diaphragm 31 is attached to a specified portion of the actuator module 32 so that the vibration is transferred from the actuator module 32 to the diaphragm 31 in a manner in which the diaphragm 31 strikes the actuator module 32 to come into physical contact and the diaphragm 31 is attached to the front case 12 with the frame-like gasket member 33 between the diaphragm 31 and the front case 12 and, therefore, deformation of the gasket member 33 in a direction of its width (in a direction toward a central portion of the aperture) is suppressed by the approximately ⊐-shaped or C-shaped (when seen from a plane direction) stopping rib 42a formed in a holding frame 42. Here, the gasket member 33 is bonded to the diaphragm 31 by the frame-like double-faced adhesive sheet 37 and to the putting-face 17m of the front case 12 by the frame-like double-faced adhesive sheet 38.

This enables the gasket member 33 to support the diaphragm 31 without interfering with the vibration of the diaphragm 31 and also enables the prevention of the entry of a foreign matter such as the dust into the inside of the upper cabinet. Moreover, if the gasket member 33 is made flat due to its secular changes (in geometry), causing the gasket member 33 to be extended in its width direction and if an inner wall face 33a of the gasket member 33 is displaced toward a central portion of the aperture 14 due to an increase in the width of the gasket member 33, since an outer wall face 42m of the stopping rib 42a presses the inner wall face 33a of the gasket member 33, the extension and displacement are stopped and deformation caused by deterioration of the gasket member 33 is reliably suppressed to maintain a dustproof function and to prevent interference with components mounted inside of the liquid crystal display panel 41.

The display section 9 is placed on an inner side of the upper cabinet 6 and is made up of, for example, a transmission liquid crystal display device. The liquid crystal display device has the liquid crystal display panel 41, a backlight (not shown) to supply illuminating light to the liquid crystal display panel 41, a driving circuit (not shown) to drive the liquid crystal display panel 41, and the holding frame 42 to hold the liquid crystal display panel 41, the backlight or a like. The liquid crystal display panel 41 is a transmission liquid crystal display panel with a TFT (Thin Film Transistor) structure which has a TFT substrate (not shown) on which a plurality of TFTs (not shown) and transparent pixel electrodes (not shown) are formed, a facing substrate (not shown) fixed, with a clearance of several μm between the TFT substrate and the facing substrate, in a direction opposite to the TFT in which a coloring layer (color filter) (not shown) sealed in the clearance, and a pair of deflectors (not shown) placed outside of the TFT substrate and the facing substrate.

The backlight has a light source unit (not shown) made up of a plurality of LEDs (Light Emitting Diodes) serving as a point-like light source, a light-guiding plate (not shown) to receive light emitted from the light source unit and to emit plane-shaped illuminating light to the liquid crystal display panel 41, a diffusion sheet (not shown) to correct variations in luminance, an optical component group (not shown) including a prism sheet to gather light entering from a light-guiding side and emits light to the liquid crystal display panel 41 from its rear side to allow an observer to visually identify light having been transmitted through the liquid crystal display panel 41. On a surface side (diaphragm 31 side) of the holding frame 42 is placed optical component/member groups, with the optical component/member groups sandwiched between the holding frame 42 and the liquid crystal panel 41 by using, for example, a frame-like double-faced adhesive sheet.

In the embodiment, as shown in FIGS. 1 to 7, on a surface side of the holding frame 42 is placed, the approximately ⊐-shaped or C-shaped (when seen from a plane direction) stopping rib 42a to press an inner wall face 33a of the gasket member 33 by an outer wall face 42m of the holding frame 42 when the gasket member 33, due to its secular changes (in geometry), is made flat and to be extended in a manner to surround the liquid crystal panel 41 and, as a result, the inner wall face 33a comes near the stopping rib 42a. Height of the stopping rib 42a is set at a level at which an end of the stopping rib 42a does not come into contact with a rear face of the diaphragm 31.

Moreover, the outer wall face of the dust entry preventing cushion component 34 strikes the inner wall face 42n of the stopping rib 42a to come into physical contact and the dust entry preventing cushion component 34 is placed in a circumferential portion of a surface of the liquid crystal display panel 41.

On the rear side (rear cover side) of the holding frame 42 is attached a printed circuit board 43 made up of specified circuit patterns formed on an insulating substrate (not shown) and electronic components installed thereon and the liquid crystal display panel 41 and the light source unit are connected to the printed circuit board 43 via an FPC (not shown).

The controlling section 22 has a CPU (Central Processing Unit) or a like and executes various processing programs stored in the storing section 23 and controls each component to perform communication control processing, displaying and operating control processing, or a like, by using various registers and flags stored in the storing section 23.

The storing section 23 is made up of semiconductor memories such as a ROM (Read Only Memory), a RAM (Random Access Memory), or a like and has a program storing area in which a communication processing program to be executed by the controlling program, browser, mailer or a like are stored and an information storing area in which various kinds of pieces of information including setting information for various functions, communication history information, telephone directory character message information, moving picture file with voice are stored, and includes various registers and flags to be used when the controlling section 22 executes programs.

The wireless communicating section 26 is made up of an RF (Rectifier) circuit (not shown), a modulating and demodulating circuit (not shown), a baseband processing circuit (not shown), or a like and modulates a voice or data to transmit the modulated voice or data as wireless waves through the antenna 25 and receives wireless waves to generate a voice or data which is used to carry out telephone conversations or data communication according to specified protocols.

The operating section 27 has a function key group (not shown) including a browser mode selecting key to drive a browser to browse home pages, a determining key to determine operations, a menu key (not shown) to display an operation menu, an input mode switching key (not shown) to switch a character inputting mode, a telephone directory key (not shown) to register and/or search a telephone directory, a conversation start key (not shown) to carry out a telephone conversation, a clear key (not shown) to return an operational state back to a previous state by one, a power key (not shown) to discontinue various operations performed by turning power ON or OFF, a cursor key (not shown) to move a cursor on a display screen up-and-down and left-and-right directions and a ten-key group (not shown) to input, for example, numeral characters or a like.

The two-shaft hinge 4, as shown in FIGS. 1 and 2, is made up of a base plate 51 attached and fixed to the upper cabinet 6, a rotational shaft 52 supported by the base plate 51 so that the rotational shaft 52 is allowed to rotate freely whose end extrudes in parallel with the display screen of the display section 9 of the upper unit 2, and a rotational shaft 53 placed in a direction perpendicular to the rotational shaft 52 at an end of the rotational shaft 52 which allows the rotational shaft 52 to rotate freely. The upper unit 2 and lower unit 3 are folded by the rotation of the upper cabinet 6 surrounding the rotational shaft 53 relative to the lower cabinet and, while a plane containing a display face of the upper unit and a plane containing an operational face of the lower unit 3 intersect each other, the upper unit 2 rotates.

To assemble the portable cellular phone 1 of the embodiment, as shown in FIGS. 1 and 2 and FIG. 12, the gasket member 33 is bonded to a circumferential portion of a rear face of the diaphragm 31 by using the frame-like double-faced adhesive sheet 37 interposed between the diaphragm 31 and gasket member 33 and the double-faced adhesive sheet 38 is bonded to a side of the gasket member 33 opposite to the diaphragm 31. Next, as shown in FIGS. 1 and 2, and FIG. 13, the actuator module 32 is bonded to a specified portion of a rear of the diaphragm 31 by using, for example, a double-faced adhesive tape. Then, as shown in FIGS. 1 and 2, and FIG. 13, positioning is performed on the diaphragm 31 so that a specified rectangular portion 31m of the side wall 31a strikes the corresponding corner portion 16a of the side wall 16 of the front case 12 to come into physical contact and the gasket member 33 is bonded to the putting-face 17m of the front case 12 by using a double-faced adhesive sheet 38 to bond the diaphragm 31 to the front case 12.

Next, as shown in FIGS. 1 and 2, to a surface side of the holding frame 42 (on a side to which the diaphragm 31 is attached) is fixed the liquid crystal display panel 41 with the optical component group sandwiched between the holding frame 42 and liquid crystal display panel 41 by using, for example, a frame-like double-faced adhesion sheet. Then, as shown in FIGS. 1 and 2, and FIG. 7, the dust entry preventing cushion component 34 is attached to the holding frame 42 so as to be placed in the circumferential portion of the liquid crystal display panel 41. Next, the printed circuit board 43 is attached, in an overlapped state, to the rear face side of the holding frame 42 and an end of the FPC is connected to a connector (not shown) placed in an end portion of the printed circuit board 43. Then, to the holding frame 42 on which the liquid crystal display panel 41, light source unit, dust entry preventing cushion component 34, printed circuit board 43, or a like are mounted is attached the front case 12 from the diaphragm 31 side.

Then, as shown in FIGS. 1 and 2, a component group including the diaphragm 31, actuator module 32, gasket member 33, or a like is mounted on the front case 12 and the actuator module 32 is connected to the printed circuit board 43 by a connector. The portable cellular phone 1 is finally assembled by attaching and fitting the rear cover 13 in or by fastening the rear cover 13 using a fixing means (fastening) such as a female screw, male screw, or a like. This causes the diaphragm 31 to strike a specified portion of the actuator module 32 to come into physical contact, thus enabling the transfer of vibration.

In the portable cellular phone 1 assembled as above, in a state in which its cabinet is opened, for example, when an incoming call arrives, the controlling section 22 controls a ringing-sound making section 29 so that a ringing-sound is generated and also controls the light emitting section 11 so that an LED emits light to make notification of an incoming call. Then, a telephone conversation is started by pressing down the conversation start key of the operating section 27 and a voice from a person with whom the telephone conversation is carried out is output from the voice outputting section 7. That is, the controlling section 22 controls the piezoelectric driving section 8 so that an amplified driving signal is fed to the actuator module 32. The actuator module 32 receives the amplified driving signal and converts the driving signal being an electric signal into an acoustic signal to vibrate the diaphragm 31. Sound waves are directly emitted from the diaphragm 31.

An operator (user) can carry out a telephone conversation without putting the diaphragm 31 to an ear, that is, the operator can hear a receiving voice and makes a voice toward a microphone section 28, with the portable cellular phone 1 being faced toward a front. Here, if an image (moving picture or still picture) is contained in received data, the operator can carry out a conversation while seeing a display screen of the display section 9. Moreover, when a program (moving picture with a voice) downloaded from a site is to be run, an image is displayed on the display section 9 with the cabinet being opened and a voice is emitted from the diaphragm 31 of the voice outputting section 7. When a function of reading out mail is used, a voice is emitted from the diaphragm 31.

Moreover, since the gasket member 33 is so configured as to support the diaphragm 31 without interfering with vibration of the diaphragm 31, a voice sound is emitted reliably from the diaphragm 31, making it possible for an operator (user) to clearly hear a voice even if the portable cellular phone 1 is put comparatively apart from the operator.

Moreover, when the gasket member 33 is made flat due to its secular changes (in geometry), causing the gasket member 33 to be extended in its width direction and, as shown in FIG. 14, when the inner wall face 33a of the gasket member 33 is displaced toward a central portion of the aperture 14 attributed to an increase in the width of the gasket member 33, the outer wall face 42m of the stopping rib 42a is made to press the inner wall face 33a of the gasket member 33, the extension and displacement are stopped and deformation caused by deterioration of the gasket member 33 is reliably suppressed and, therefore, a satisfactory dustproof function is maintained and interference with components mounted inside of the liquid crystal display panel 41 or a like is prevented.

Thus, according to the embodiment of the present invention, since the stopping rib 42a is mounted on the holding frame 42, displacement of the inner wall face 33a toward a central portion of the aperture 14 due to an increase in the width of the gasket member 33 can be suppressed by the pressing of the inner wall face 33a by using the outer wall face 42m of the stopping rib 42a and, therefore, deformation caused by deterioration of the gasket member 33 can be reliably suppressed to maintain a dustproof function and interference with other components mounted inside of the liquid crystal panel 41 or a like can be avoided.

Also, since the operator can hear a receiving voice without putting the diaphragm 31 to an ear, with the portable cellular phone 1 being faced to a front, the receiving voice can be heard reliably and clearly unlike in the conventional case where a voice becomes unclear due to displacement of the diaphragm 31 from the position of a voice hole, and a telephone conversation can be carried out by making voice toward the microphone section 28 even with the ear put apart from the portable cellular phone 1.

Also, when an image (moving picture or still picture) is added to data, an operator can hear a voice while seeing a display screen of the display section 9.

Furthermore, by employing the flat panel speaker 35, it is made possible to make the portable cellular phone 1 thin and small.

It is apparent that the present invention is not limited to the above embodiments but may be changed and modified without departing from the scope and spirit of the invention. For example, in the above embodiment, the case in which the diaphragm 31 also serves as the screen component is described, however, the diaphragm may be used exclusively without serving as another component. In this case, it is not necessary that the diaphragm 31 is transparent. Moreover, the component on which the stopping rib can mounted is not limited to the holding frame, that is, the stopping rib 42a can be mounted on the front case. The shape that the stopping rib 42a can take is not limited to the approximately C-shape, that is, the stopping rib 42a may be of ⊐-shaped or C-shaped. Also, the stopping rib 42a may be configured so as to be placed intermittently along a specified closed curve. Also, the cabinet may be made of metal or a resin. Moreover, in the above embodiment, the voice outputting section 7 is mounted at one place, however, may be placed at two or more places. In this case, the voice outputting section 7 may be placed on any one of the upper 2 and lower units 3.

Also, by adding an electronic camera unit, the portable cellular phone 1 may have a photographing function or video phone function. In this case, the voice outputting section 7 may produce a pseudo shutter sound at time of photographing. The portable cellular phone 1 of the present invention may be so configured that, when receiving a signal, an incoming call is output from the voice outputting section 7 with an amount of a sound calibrated. The diaphragm 31 may be bonded directly to the gasket member 33 by using not the double-faced adhesive but an adhesive layer or may be bonded by using a thermal welding method. The gasket member 33 may be attached to the front case by using methods other than the adhesion method.

In the above embodiment, the case in which the rotational shaft 52 is placed in a direction parallel to a main face of the upper cabinet 6 is described, however, the rotational shaft 52 may be placed in a direction perpendicular to the main face of the upper cabinet 6. In this case, the upper unit 2 rotates in a state in which a display face of the upper unit 2 is approximately in parallel to an operating face of the lower unit 3. The present invention also may be applied not only to the two-shaft type foldable portable cellular phone but also to a foldable portable cellular phone that can be simply opened or closed and to a straight type portable cellular phone other than the foldable-type one.

The present invention can be applied not only to the portable cellular phone but also to a portable electronic device such as a PHS (Personal Handy-phone System), a PDA (Personal Digital Assitant), and a portable computer. Also, the present invention can be applied generally not only to the portable electronic devices but also to electronic devices such as a computer having a dustproof structure (dust entry preventing structure) for prevention from the entry of a foreign matter including dust through an aperture formed in a cabinet.

What is claimed is:

1. A dustproof structure in an electronic device comprising:
   a cap-like component attached to a cabinet of said electronic device in which an aperture is formed, with a gasket member placed at an edge of said aperture interposed between said cabinet and said cap-like component in a manner in which said cap-like component covers said aperture; and
   a gasket member pressing unit placed on a rear side of said cap-like component that faces an inside of said cabinet and having a facing portion that faces at least a partial portion of a side wall face of said gasket member and, when said side wall face is displaced, comes into contact with at least said partial portion of said side wall face to press said gasket member.

2. The dustproof structure in the electronic device according to claim 1, wherein said gasket member pressing unit suppresses deformation attributed to a decrease in thickness and/or an increase in width caused by secular changes of said gasket member.

3. The dustproof structure in the electronic device according to claim 1, wherein said gasket member comprises an approximately flat and frame-shaped component to support said cap-like component and is placed in a manner in which an inner wall face of said gasket member faces said aperture and wherein said gasket member pressing unit has a stopping unit to stop displacement, which is attributed to said increase in the width of said gasket member, of said inner wall face toward a central portion of said aperture, by pressing said inner wall face.

4. The dustproof structure in the electronic device according to claim 3, wherein said electronic device includes a functional unit having a specified function and wherein a holding base unit to hold said functional unit on a side being opposite to a side on which said cap-like component of said aperture is placed and wherein said stopping unit is mounted in an extruded state on the aperture side of said holding base unit and has an outer wall face being opposite to said inner wall face.

5. The dustproof structure in the electronic device according to claim 3, wherein said stopping unit is placed in an extruded state at an edge on the cap-like component side of said aperture and has an outer wall face being opposite to said inner wall face.

6. The dustproof structure in the electronic device according to claim 1, wherein said electronic device has a flat panel speaker which makes an actuator vibrate a diaphragm for emission of sound waves and wherein said cap-like component also serves as said diaphragm and wherein said gasket member supports said cap-like component in a state being bonded to said cap-like component while being deformed in a manner to correspond to vibration of said cap-like component at least along a direction of a thickness.

7. The dustproof structure in the electronic device according to claim 6, wherein said actuator has a piezo-electric element and is in contact with a specified portion of said cap-like component.

8. The dustproof structure in the electronic device according to claim 4, wherein said functional unit comprises a display unit to display character information and/or image information and wherein said cap-like component is made of a transparent material and is used to protect a display screen.

9. The dustproof structure in the electronic device according to claim 4, wherein said outer wall face is formed consecutively and intermittently along and around said inner wall face.

10. The dustproof structure in the electronic device according to claim 1, wherein said gasket member is used to prevent the entry of a foreign matter including at least dust into said cabinet from said aperture.

11. An electronic device having a dustproof structure which comprises:
    a cap-like component attached to a cabinet of said electronic device in which an aperture is formed, with a gasket member placed at an edge of said aperture interposed between said cabinet and said cap-like component in a manner in which said cap-like component covers said aperture; and
    a gasket member pressing unit placed on a rear side of said cap-like component that faces an inside of said cabinet and having a facing portion that faces at least a partial portion of a side wall face of said gasket member and, when said side wall face is displaced, comes into contact with at least said partial portion of said side wall face to press said gasket member.

12. The electronic device according to claim 11, provided with a flat speaker panel which makes an actuator vibrate a diaphragm for emission of sound waves and wherein said cap-like component also serves as said diaphragm and wherein said gasket member supports said cap-like component in a state being bonded to said cap-like component while being deformed in a manner to correspond to vibration of said cap-like component at least along a direction of a thickness.

13. A dust entry preventing method employed in an electronic device in which a cap-like component is attached to a cabinet in which an aperture is formed, with a gasket member interposed between said cap-like component and said cabinet, in a manner in which said cap-like component covers said aperture, said method comprising:
    a step of mounting said gasket member pressing unit placed on a rear side of said cap-like component that faces an inside of said cabinet and having a facing portion that faces at least a partial portion of a side wall face of said gasket member to press said gasket member;
    wherein said facing portion of said gasket member pressing unit, when said side wall face of said gasket member is displaced, comes into contact with at least a partial portion of said side wall face to press said gasket member so that deformation caused by changes in a dimension and shape of said gasket member is suppressed.

* * * * *